Jan. 27, 1942. H. L. MUELLER 2,271,273
HYDRAULIC BRAKE CONTROL FOR BICYCLES
Filed May 18, 1940

INVENTOR.
HOMER L. MUELLER
BY Oberlin, Limbach & Day
ATTORNEYS

Patented Jan. 27, 1942

2,271,273

UNITED STATES PATENT OFFICE 2,271,273

HYDRAULIC BRAKE CONTROL FOR BICYCLES

Homer L. Mueller, Cleveland, Ohio, assignor to The Cleveland Welding Company, Cleveland, Ohio, a corporation of Ohio Application May 18, 1940, Serial No. 335,923

2 Claims. (Cl. 188—152)

This invention relates as indicated to hydraulic brake control means for bicycles and the like and more particularly to such control means adapted to be operated by rotation of a handle on the handle-bar of the bicycle.

A novel type of hydraulic brake adapted for use in bicycles and the like is disclosed in my co-pending application Serial No. 323,773, filed March 13, 1940, together with a means of operating such brake. The present invention is concerned with handle control means whereby hydraulic brakes of the type disclosed in said co-pending application, for example, may be operated, one embodiment of such means being so formed that all working parts are self-contained and out of the way.

It is, therefore, a primary object of this invention to provide hydraulic brake control means for bicycles and the like operable by simple manipulation of the usual grip or handle mounted on the handle-bar.

Another object of this invention is to provide such control means the working parts of which will be self-contained and unobtrusive.

A further object of this invention is to provide control means responsive to relative rotation of such handle and handle-bar.

Other objects of this invention will appear as the description proceeds.

To the accomplishment of the foregoing and related ends, said invention, then, consists of the means hereinafter fully described and particularly pointed out in the claims.

The annexed drawing and the following description set forth in detail certain mechanism embodying the invention, such disclosed means constituting, however, but one of various mechanical forms in which the principle of the invention may be used.

Figure 1:
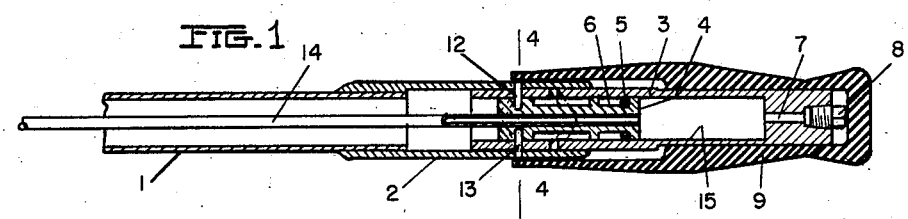
Fig. 1 is a longitudinal sectional view of a handle and portion of bicycle handle-bar illustrating one embodiment of my new invention.
Figure 2:
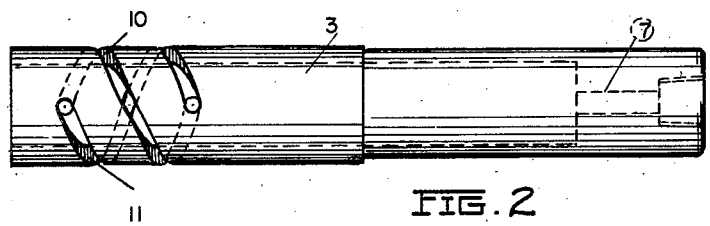
Fig. 2 is an enlarged view of the reciprocable cylinder illustrated in section within the handle in Fig. 1.
Figure 3:
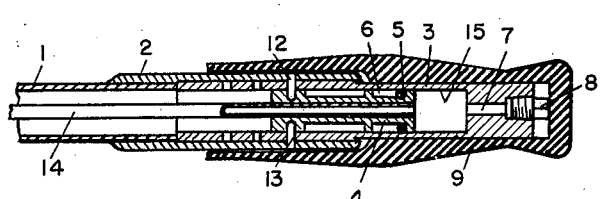
Fig. 3 is a sectional view similar to Fig. 1 but showing such handle and cylinder moved inwardly relatively to the end of such handle-bar.
Figure 4:
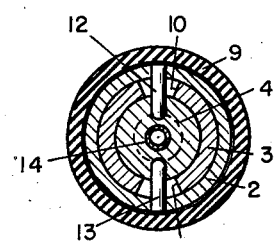
Fig. 4 is a sectional view taken along the line 4—4 on Fig. 1.
Figure 5:
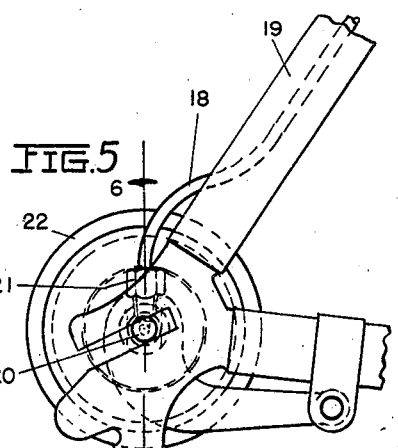
Fig. 5 is a fragmentary view of a rear fork member and axle of a bicycle illustrating the disposition of the pressure tubing leading to the hydraulic brake.
Figure 7:
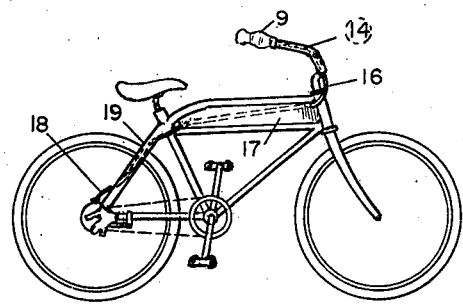
Fig. 7 is a somewhat diagrammatic view of a bicycle employing the hydraulic brake and control means of my invention.
Figure 6:
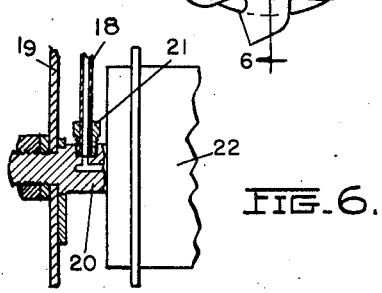
Fig. 6 is a sectional view taken along the line 6—6 on Fig. 5.

Referring now more particularly to said drawing, and especially Figs. 1 to 4, one embodiment of my invention may comprise a handle-bar 1 having an enlarged extension 2 in which a cylinder 3 is sleeved. One end of such cylinder is open to receive thrust block or piston 4 which makes a tight fit therein, a further seal being provided by packing ring 5 in piston cup 6. The other end of such cylinder opens into passage 7 which is closed at its outer end by filler plug 8. A rubber handle or grip member 9 may be slipped over such cylinder and frictionally held thereon, the inner end of such grip being enlarged to overlie extension 2 of the handle-bar. The wall of cylinder 3 beyond the head of piston 4 is slotted to provide spiral cam tracks 10 and 11. Pins 12 and 13 respectively pass through said slots, their ends being fixedly positioned in said extension 2 and said piston or thrust block 4. A copper fluid pressure line 14 passes longitudinally through said piston to communicate with chamber 15 formed in cylinder 3 by said piston, the copper tubing forming a tight seal, being firmly attached to the piston as by brazing.

It will now be seen that upon rotation of handle 9, thereby likewise rotating cylinder 3, such cylinder will be drawn inwardly by the action of said pins and spiral cam tracks (see Fig. 3) causing relative movement of said piston and cylinder with a resultant diminution of chamber 15. If such chamber has been filled with hydraulic fluid it is obvious that a portion of such fluid will be discharged therefrom by way of line 14. Upon rotation of the handle in the opposite direction cylinder 3 will be caused to move outwardly again and chamber 15 to regain its former dimensions.

Line 14 may continue within the handle-bar to within a few inches of the stem of the bicycle at which point it may connect with flexible pressure tubing 16 which enters the tank 17 and there connects with further copper tubing 18 which follows down underneath a rear fork member 19 and enters the rear axle 20 through fitting 21. The manner in which the brake 22 is operated by the hydraulic impulse is fully described in my above-identified application.

It will be seen from the foregoing that a novel hydraulic brake control means has been provided which is entirely self-contained and operable by simple manipulation of the usual grip or handle mounted on the handle-bar. As a result it is unnecessary for the operator to shift his hands from the steering means or to take his eye from the road in order to operate the brakes. The embodiment of this device illustrated in the annexed drawing constitutes a preferred form of my novel control means, the piston and cylinder assembly being mounted axially of the handle-bar whereby the outlet from the hydraulic cylinder may be carried within the handle-bar and the entire control means constructed within the handle-bar and handle.

Other modes of applying the principle of my invention may be employed instead of the one explained, change being made as regards the mechanism herein disclosed, provided the means stated by any of the following claims or the equivalent of such stated means be employed.

I therefore particularly point out and distinctly claim as my invention:

1. Hydraulic brake control means for bicycles and the like, comprising a handlebar, a piston fixedly mounted in said handlebar, an outlet passing through said piston, a hydraulic cylinder adapted to fit said piston and form therewith a fluid-tight chamber, a spiral cam slot in an extension of said cylinder, and a pin fixed in said handlebar and piston and passing through said slot whereby said cylinder will be caused to reciprocate relatively to said piston upon rotation thereof to discharge and draw in hydraulic fluid.

2. Hydraulic brake control means for bicycles and the like, comprising a handlebar, a piston fixedly secured to the end of said handlebar, a closed end cylinder telescopically engaging said piston in close sliding fit engagement, and defining a closed fluid tight chamber between the end of said piston and the bottom of said cylinder, cam means interconnecting said cylinder and said handlebar whereby relative rotation therebetween causes relative axial movement between said piston and cylinder, and a conduit, for carrying fluid to the brake to be controlled, extending axially through said piston and in communication with said closed chamber.

HOMER L. MUELLER.